United States Patent
Richard (10) Patent No.: US 6,920,492 B2
(45) Date of Patent: Jul. 19, 2005

(54) PROCESS FOR CONTROLLING DEVICES OF AN INTRANET NETWORK THROUGH THE WEB

(75) Inventor: Bruno Richard, Crolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 722 days.

(21) Appl. No.: 09/883,723

(22) Filed: Jun. 18, 2001

(65) Prior Publication Data

US 2002/0013807 A1 Jan. 31, 2002

(30) Foreign Application Priority Data

Jun. 19, 2000 (EP) .............................. 00410066

(51) Int. Cl.[7] .............................. G06F 15/177
(52) U.S. Cl. .................. 709/220; 709/223; 709/224; 709/244
(58) Field of Search ............................... 709/220, 223, 709/224, 244

(56) References Cited

U.S. PATENT DOCUMENTS

| | | | |
|---|---|---|---|
| 5,421,009 A | 5/1995 | Platt | 395/600 |
| 5,491,796 A | 2/1996 | Wanderer et al. | 395/200.09 |
| 5,860,012 A | 1/1999 | Luu | 395/712 |
| 5,948,055 A | 9/1999 | Pulsipher et al. | 709/202 |
| 5,987,513 A * | 11/1999 | Prithviraj et al. | 709/223 |
| 6,490,617 B1 * | 12/2002 | Hemphill et al. | 709/223 |
| 6,496,859 B2 * | 12/2002 | Roy et al. | 709/223 |

FOREIGN PATENT DOCUMENTS

| | | |
|---|---|---|
| DE | 198 43 324 A1 | 3/2000 |
| EP | 0 710 914 A1 | 5/1996 |
| EP | 0 998 076 A1 | 5/2000 |
| JP | 08106536 | 4/1996 |
| WO | WO 99/26169 | 5/1999 |

OTHER PUBLICATIONS

LeJeune, Urb, "HTML 3.0 Table Tutorial," *HTML Table Tutorial*, URL:www.charm.net/lejeune/tables.html (Sep. 19, 1996).
"Efficient 3D Buttons in Dynamic Hyper Text Markup Language Pages," *IBM Technical Disclosure Bulletin, U.S., IBM Corp. New York*, vol. 41, No. 1, pp. 695–698 (1998).
"Objects, Images and Applets in HTML Documents," *W3C HTML 4.01 Specification*, URL:www.w3.org/TR/html1401/struct/objects.html, (Dec. 24, 1999).
Bier, Eric A., "EmbeddedButtons: Documents as User Interfaces," *ACM Symposium on User Interface Software and Technology, U.S.*, pp. 45–53, (Nov. 11, 1991).
Hudak–David, G., "A Beginner's Guide to HTML," *National Center for Supercomputing Applications (NCSA)*, URL:www.ncsa.uiuc.edu/General/Internet/WWW/HTML-PrimerPDF.pdf (Jan. 1997).

* cited by examiner

*Primary Examiner*—Jeffrey Gaffin
*Assistant Examiner*—Niketa Patel (57) ABSTRACT

Process for control and management of an Intranet network by means of a Web browser, comprising the steps of:
- discovering the devices of an Intranet network, including the different subnets;
- extracting data representative of those devices for the purpose of compiling a file which is transmitted through a HTTP protocol to a Web server associated to a database;
- deploying a Internet Control Agent in the devices contained within said Intranet, said agent being controllable from the said Web server by a set of commands being exchanged with the HTTP or HTTPS protocol;
- regularly transmitting set of instructions to said agents for the purpose of controlling tasks to be performed within the network.

Preferably, the set of instructions is used for controlling a remote installation of a software package within the devices in accordance with selections made by the IT administrator.

12 Claims, 5 Drawing Sheets

PROCESS FOR CONTROLLING DEVICES OF AN INTRANET NETWORK THROUGH THE WEB

TECHNICAL FIELD OF THE INVENTION

The invention relates to telecommunications and more particularly to a process for controlling devices of an Intranet network via a server communicating through the Web.

BACKGROUND ART

The development of computers and telecommunications, and particularly the Internet, increases the complexity of the tasks for the network manager, also known as the Information Technology Administrator, who has to manage the networks and network nodes, and particularly to ensure that the devices forming the Intranet of a company or a private organisation fully fit the requirements of the users. This particularly covers the management of the different elements of the network, including the nodes, the computers, the printers, the switches, the hubs and the modems. The IT manager has to ensure that the different elements which compose a network fully operate in a satisfactory fashion, but also that each machine is loaded with the appropriate Operating System, and also With the adequate software applications.

Different tools are known for facilitating the management of devices, printers, routers, switches and computers composing an Intranet network. HP OpenView™ manufactured by Hewlett Packard Inc., IBM TIVOLI™ manufactured by IBM Corp. , CS Unicenter TNG etc . . . HP TopTools™ is another tool for facilitating the network devices or network nodes management.

Among many different installation and maintenance operations, the IT Administrator has to support the PC cleanup and defragmentation of the different hard disk of the computers, the loading of the appropriate software packages and particularly the update of the antivirus tools, the backup of the files, the software update, the resources monitoring and the e-mail notifications.

Although some tools have been designed to facilitate the tasks of the IT administrator, basically, by using specific agents on the different devices, it still appears that the handling and the management of an Intranet requires a highly qualified professional, which has to remain within the vicinity of the Intranet network.

There is a wish for enabling the control, the maintenance, the update of the devices within an Intranet by a Web server which is located elsewhere, outside the Intranet, what is generally hindered or made difficult by the presence of the proxy and the firewall.

The arrangement of a Firewall mechanism for the purpose of supervising the ports of communication with the Internet network is an obstacle to such external control.

The technical problem to be solved by the present invention is to design a process which allows the handling of a Intranet network, including the different subnets composing that network, by an external centralized Web server for the purpose of constituting a Web portal dedicated to the control, the inventory and the maintenance of an Intranet network.

Another technical problem is to facilitate the control of an Intranet network by an external Web browser, without requiring changes to be brought to the existing proxy and firewall arrangement and without requiring installation of specific administration tools.

SUMMARY OF THE INVENTION

It is an object of the present invention to control an Intranet network by means of an external Web server operating as a portal dedicated for management, inventory, and maintenance of the Intranet.

It is a further object of the present invention to collect via an external Web server a comprehensive description of the architecture of an Intranet network for the purpose of asset management.

It is another object of the present invention to provide a comprehensive control of the devices composing an Intranet network by an external Web server.

These and another objects are achieved by means of the present invention which is defined in the independent claims. Basically, there is provided a process for controlling an Intranet network by a Web server which involves the step of:

- discovering the devices of an Intranet network, including the different subnets;
- extracting data representative of those devices for the purpose of compiling a file which is transmitted through the HTTP protocol to a Web server associated to a database;
- deploying a Internet Control Agent in the devices contained within said Intranet, said agent being controllable by a set of commands being exchanged with the HTTP or HTTPS protocol;
- regularly transmitting set of instructions to said agents for the purpose of controlling tasks to be performed within the network.

In one embodiment, the set of instructions is used for the purpose of controlling a remote installation of a software package within the devices in accordance with selections made by the IT administrator.

In another embodiment of the invention, there is controlled the installation of an executable file causing the gathering of technical data within the system by means of an analysis of BIOS characteristics and the registry. There is therefore provided a wide and comprehensive inventory of the devices connected to the network.

A set of specific commands has been designed for achieving the control of the Internet Control Agent by the Web server. Those includes an EXECUTE command for the purpose of executing a particular executable file located in a share resource or on a local hard disk, with a first parameter defining the maximum time allowed to the execution and a second parameter which defines the file where a report of the execution has to be created and transmitted to the Web server. A DOWNLOAD command is used for controlling the download of files with the appropriate Uniform Resource Locator (URL). A SLEEP command is used for scheduling the next execution of the Internet Control Agent for the purpose of the execution of a new set of commands or instructions.

In one embodiment, the discovery of the different devices of the Intranet uses a mechanism based on the current IP address, the subnet mask being associated to the address of the router of the considered subnet. All the active nodes which are comprised within a considered submask are successively discovered by means of a PING. When a node appears to be detected, a Simple Network Management Protocol (SNMP) request is then used for accessing to information relevant to that device and determining the type of the machine. In the case of a router, a further SNMP request permits to discover the interfaces and thus, the possible existence of additional subnets, with the subnet masks. Each discovered subnet is subject of the same iterative mechanism and the different nodes composing the Intranet network are progressively disclosed and reported.

DESCRIPTION OF THE DRAWINGS

An embodiment of the invention will now be described, by way of example only, with reference to the accompanying drawings, wherein.

DESCRIPTION OF THE PREFERRED EMBODIMENT OF THE INVENTION

Figure 1:
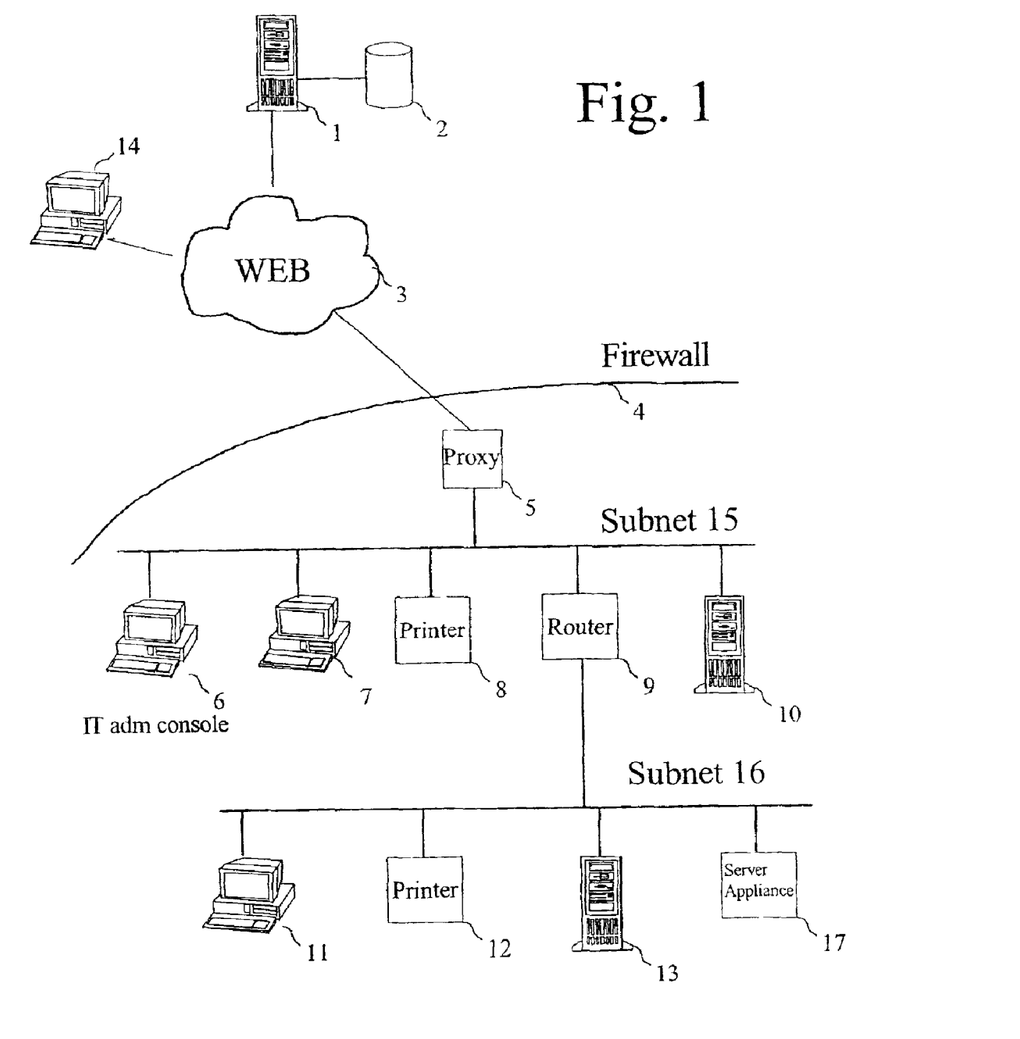
FIG. 1 illustrates the general architecture of an Intranet network which communicates with a centralised Web server.

With respect to the FIG. 1 there is illustrated the control of an Intranet network which communicates via a Proxy 5 and a firewall arrangement 4 to the Web 3. As an example, the Intranet network may comprise two subnets 15 and 16 communicating via a router device 9. Subnet 15 includes IT administrative console 6, a computer client 7, a printer 8 and a server 10. Subnet 16 includes a computer client 11, a printer 12, a server 13, and optionally, a server appliance 17 which purpose is to communicate with a server 1. As will be shown below with details, a server 1 is associated to a database 2 and is used for controlling, for the maintenance and inventory of the Intranet network.

A Firewall 4 is used for separating the Intranet network from the Web. As known by the skilled man a firewall arrangement is used for filtering the communication exchanged between the network devices that are connected outside the Intranet and those included within the Intranet. Such a firewall is generally based on one proxy element, similar to proxy 5 which is represented on the FIG. 1, and two different routers (not shown). A first router is generally dedicated to the interface with the Web while a second router handles the frames which are exchanged with the devices inside the Intranet. Any direct exchange of frames between the Intranet and the Web is avoided and all devices communicate through the proxy, thus substantially securing the internal organisation of the Intranet.

It will be described now how the external Web server 1 can take the control of the devices composing the Intranet for the purpose of management, inventory and maintenance of the different components of the network.

Figure 3:
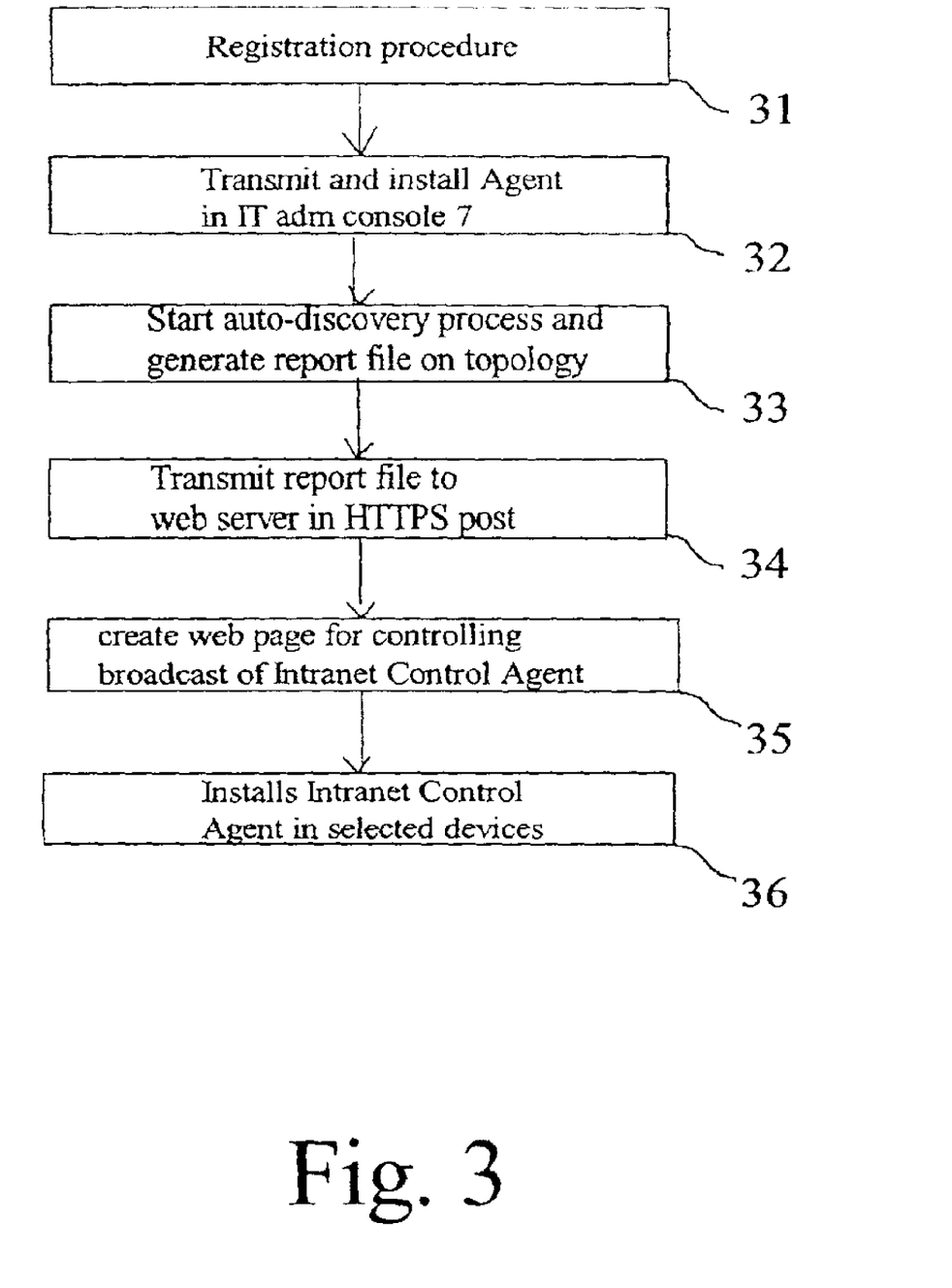
FIG. 3 is a flow chart illustrating the installation of the Internet Control Agent within the different devices, under control of Web server 1.

The process involves a registration procedure by the IT administrator to the external Web server 1, in step 31. To achieve this, the IT administrative uses a HTTP standard request to the server 1 by using the conventional browser existing in the console or computer 7, such as, for instance, Internet Explorer™ 4 or 5 (manufactured by Microsoft Corp.) or Netscape Navigator™ (manufactured by Netscape Communications Corp.). The communication can be secured by the user of the HTTPS (RFC 2660) protocol for securing the communication between the IT administrator and the Web server 1. During the registration procedure, the IT administrator is assigned a registration number, with a logging account and a password.

The registration procedure is followed by the transmission to the IT administrative console, in step 32, of an installation package of a Internet Control Agent. In the preferred embodiment, the package is designed for a setup procedure for Windows™ 9x or Windows™ NT type machines, and comprises reference to the newly registered account. More particularly, the package is a signed executable file which supports automatic extraction and installation, as well as unattended setup. In one embodiment, the Internet Control Agent may be directly received as an attachment of an electronic mail. For Windows™ 9x type machines, a login script may also be used.

As will be shown below, the Internet Control Agent, once installed in console 6 of IT administrator, exchanges control information with the server 1 through the HTTP protocol, and particularly the GET and POST requests. The particular format of the HTTP GET request is defined in the well-known rules laid down in the Request For Commands (RFC) 2.6.1.6, which are available at the following address www.w3.org/protocols. Since those rules are well known to the skilled man, they will not be elaborated further on. Use of the secure version of HTTP, HTTPS (RFC 2660) is an extension, which enables the protection of the users privacy by encrypting the profile information in transit.

Internet Control Agent receives the HTTP references of proxy 5, for instance, under the form of http://proxy.company.com:8080. In one particular embodiment, that reference can be automatically incorporated by server 1 into the installation package transmitted in step 32. This can be achieved by constructing, during the registration procedure of step 31, a Web page containing a Hyperlink to a proxy detection script. By accessing the internal parameters of the registry of the IT Administrator console 6, the settings of the proxy are discovered, and can them be posted back to server 1 via an HTTPS POST request. The use of such a script is well known to the skilled man and will not be further developed.

The auto-discovery process can then be initiated in step 33 for the purpose of gathering a comprehensive description of the Intranet architecture and the different devices composing the network. Two different embodiments may be used for this purpose.

In a first embodiment, a Server Appliance 17 is attached to the Intranet network, and includes means for carrying out the discovery process and collecting the information being gathered for the purpose of generating a report file. Such a discovery facility which may be used within the Intranet is known to the skilled man. An example of such a tool is TopTool™, which is manufactured by the Applicant of the present application. Once the information has been gathered on the Intranet, a text or eXtended Markup Language (XML) file is transmitted via a HTTPS post to the server 1. For that purpose, the Server Appliance 17 particularly includes the account registration number assigned by server 1 to the IT administrator as well as the accurate settings of the proxy.

In a second embodiment, the server 1 prepares a Web page containing a hyperlink referring to a script which is executed on the IT administrator console 6. The network discovery script is then automatically executed and the auto-discovery mechanism is launched.

The auto-discovery mechanism is based on the current IP address, the subnet mask being associated to the address of the router of the considered subnet, e.g. subnet 15 or subnet 16. In this way, all the active nodes which are comprised within a considered subnet are successively discovered by means of a PING request. When a node appears to be detected, a Simple Network Management Protocol (SNMP) request is then used for accessing to information relevant to that device and determining the type of the device. In the case of a router, a further SNMP request permits to discover the interfaces and thus, the possible existence of additional subnets. Each discovered subnet can be subject of the same iterative mechanism and the different nodes composing the Intranet network are progressively disclosed and reported.

Figure 2:
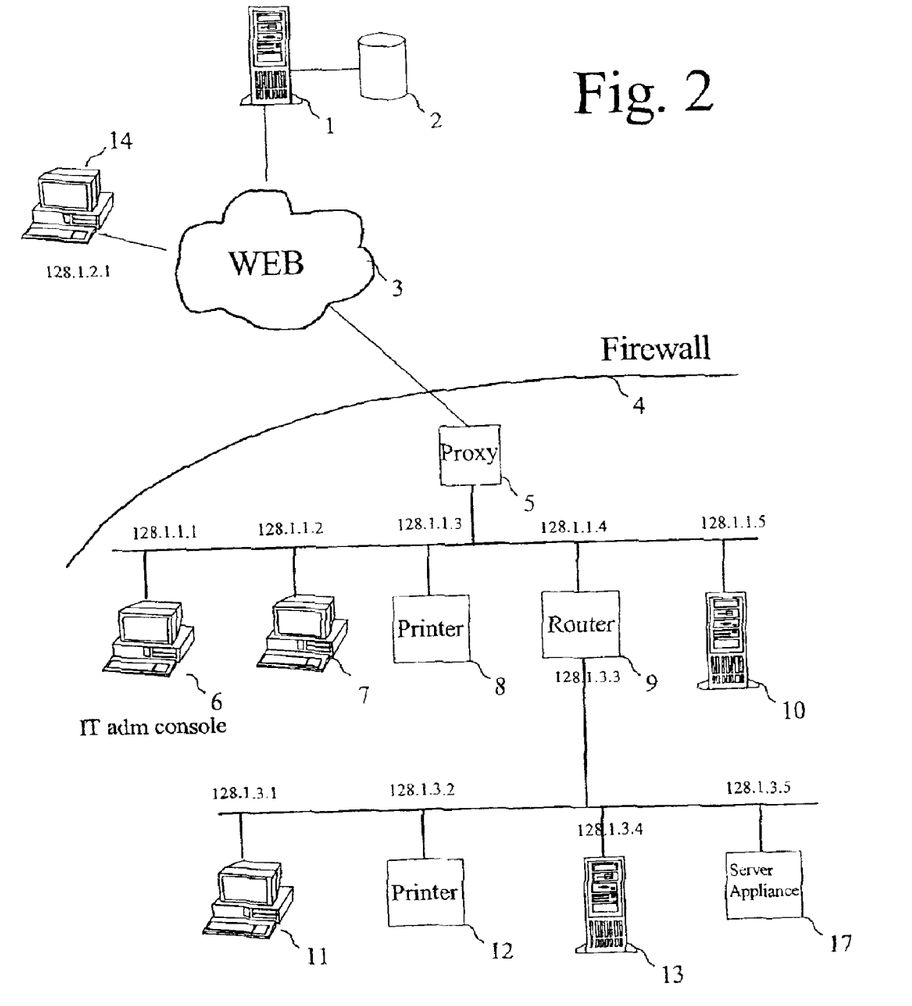
FIG. 2 illustrates the assignment of the IP addresses to the architecture shown in FIG. 1.

The auto-discovery process thus permits the elaboration of a comprehensive description of the topology of the Intranet, including the different subnets and the IP addresses of the different devices. In the particular case of the architecture which is shown in FIG. 2, the auto-discovery process produces a table comprising the different elements of the network, with the following information:

| Subnet 15: | |
| --- | --- |
| Computer (6): | 128.1.1.1 |
| Computer (7): | 128.1.1.2 |
| Printer (8): | 128.1.1.3 |
| Router(9): | 128.1.1.4 |
| Server(10): | 128.1.1.5 |
| Subnet 16: | |
| Computer (11): | 128.1.3.1. |
| Printer (12): | 128.1.3.2. |
| Server (13): | 128.1.3.4 |
| Server appliance | 128.1.3.5. |

Such a table may be compiled within a text or XML file and transmitted to server 1 via a HTTPS POST, for the purpose of a final storage within the database 2.

In one embodiment, the auto-discovery mechanism is regularly executed, either by Server Appliance 17 or by the script mechanism within console 7, so as to ensure that the description of any device is progressively incorporated within the database 2.

When the topology of the Intranet network, including the subnets and the IP addresses of the devices, has been collected and included within a report file, e.g. a text or XML file, the latter is being transmitted in step 34 to the server 1 via a HTTPS POST request. Such a request may easily be conveyed throughout the firewall mechanism without requiring any change to the latter, as the HTTP and HTTPS outbound connections are usually left open in a firewall. The precise information relevant to the topology of the Intranet network can then be stored within the database 2 which is associated to Web server 1.

In step 35, the external server 1 produces a Web page which is displayed within the browser of the IT administrator for the purpose of controlling the distribution of the Internet Control Agent within the different Intranet devices. Practically a Web page is elaborated within the server 1 which summarises the different devices which were discovered by the server 1, and for which the IT Administrator may decide, or not, to include within the broadcast and diffusion of the Internet Control Agents. In one embodiment, the Web server may use a Graphical User Interface (G.U.I) on console 6 for the purpose of providing a wide and comprehensive description of the topology of the network, of the different PC clients comprised within the network. When the Graphical User Interface is being started, the IT administrator is being prompted to select the particular devices within the Intranet which will be managed by the external server 1.

Further to the selection of the particular devices which will be covered by the control process of external Web server 1, the downloading and the installation of the Internet Control Agent is launched within the selected devices of the Intranet. In the embodiment based on Server Appliance 7, the installation file of the Internet Control Agents may be advantageously loaded within that Appliance 7 so as to reduce the data exchanged with the Web.

The installation of the Internet Control Agent can then be executed in step 35 in the appropriate devices, in accordance with the selection made by the IT administrator, and registered within database 2. It should be noticed that the latter may vary in accordance with the type of the machine being considered but, generally, all devices may receive a communication agent, and particularly the printers.

The following description will be more particularly elaborated for the case of the computers and servers. Clearly there is provided an extensive control possibilities to the computers attached to the Intranet network.

Different modes of operation may be used for achieving the installation of the Internet Control Agent in the devices.

In one embodiment, the installation package of the Agent can be enclosed within one electronic mail and transmitted to the different users.

In a second embodiment the installation may be achieved by means of a login script, i.e. an executable file which is executed as soon as the user of the devices is login on. That login script is elaborated by the server 1 by means of the information stored within database 2. The login script is embedded into a Web page constructed by server 1, and which the IT administrator may access from his console 6. He may then installs that login script on the Primary Domain Controller (PDC) of the network so that the latter is automatically executed when the users are login in.

It will be more particularly described a third embodiment which may take a great advantage of the NT Service Control Manager existing in the NT type machines. The NT SCM is deviated from the usual use for the purpose of providing an automatic execution and installation of any executable file located in a shared resource. The installation package file of the Internet Control Agent installation package includes all the files which are normally required for a local setup procedure, as well as the executable file—the setup.exe— which causes the launching of the installation procedure. That file has to support the unattended mode, which is that generally involved when the user types the "-s" switch on the command line (unattended setup).

In addition to those files, the installation package of the Agent includes an additional description file, hereinafter referred to as package.ini file. Package.ini file may take the form of a text file and contains the description of the installation files which are involved in the setup procedure. It particularly includes the precise list of the installation files required for a local setup procedure, plus an additional line carrying the command which is required for starting the local setup procedure.

The selection of one device by the IT administrator in step 35, there is Web server in a Web page created by server 1, causes the downloading in step 36 of the corresponding installation package, as well as a particular—so-called pusher.exe executable file in console 6, which is then executed.

Figure 4:
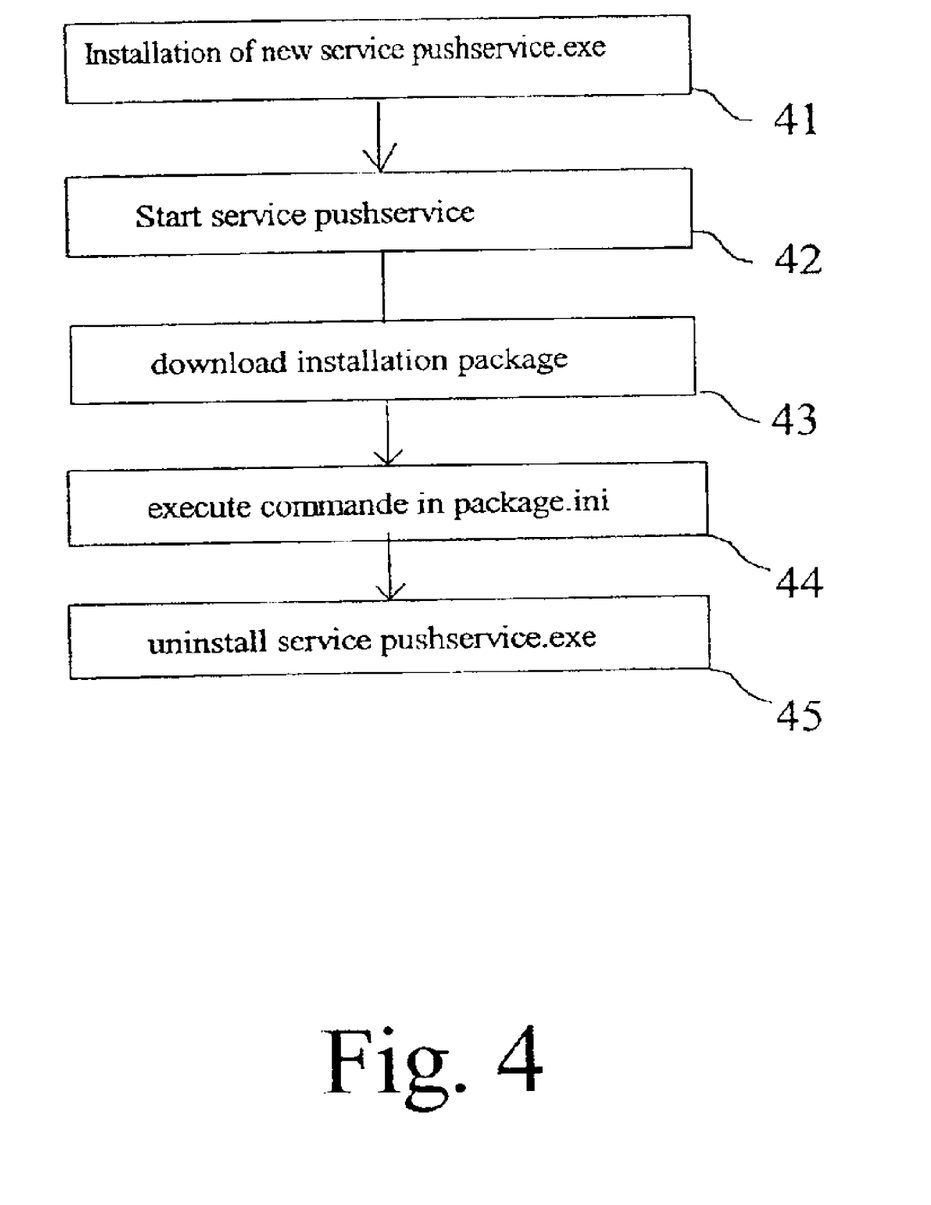
FIG. 4 is a flow chart of the process of installing a new NT service called pushservice.exe.

As shown in FIG. 4, the process which is executed by pusher.exe executable file causes, in step 41, the installation of a new NT service on one client, for instance computer 11, hereinafter referred to as pushservice.exe. This is achieved by means of the use of the NT Service Control Manager (SCM) of computer 11, thanks to the administrative rights given to IT administrator on that particular machine. As known by the skilled man, Microsoft NT™ and Microsoft 2000™ supports an application type known as a service which takes the form of a .exe or .dll, for instance. A service application conforms to the interface rules of the SCM. It can be started automatically at system boot, or by a user through the Service Control panel applet, or by an application which uses the service functions included in the Microsoft™ WIN32™ Application Programming Interface (API). The process which is described below takes advantage of the NT service which is generally used for local files, drivers, anti-virus programs, Internet Protocol and TCP/IP drivers, and hard disk drive compression mechanisms. The process which is described herein after however deviates the normal use of the standard NT service for the purpose of executing a remote executable file located within a shared resources on the Intranet, for instance Server Appliance 17, but which can also be downloaded from the Web. Once it has been registered and installed as a service, the executable file can be started on a computer without being present on the hard disk drive of the latter. It should be noticed that the particular executable file—herein referred to as the pushservice.exe—is compiled in accordance with the prescriptions applying to the services, and which are defined in the Microsoft specifications. Particularly, the entry point of that executable file is not referring to WINMAIN as for the usual standard executable files, but refers to a service entry which WINDOWS NT decodes as such.

Once registered by the NT Service Control Manager, the NT service receives the following reference:

\\server\share\pushservice.exe

A reference to the package software of the Internet Control Agent which is located within a shared resources, is used as an option of the command line, e.g.

\\server\share\package.ini

When it is installed, the new NT service is started by the IT administrator controlling the Web page displayed by server 1, in step 42. The starting of the NT service complies with the usual NT Service Control Manager procedures. That causes the instantiation of the service into the memory of the computer client and starts its execution. The new NT service becomes available and is automatically executed within that computer, what results in the identification of the software package which is to be installed, ie the Internet Control Agent. This is achieved by means of the extraction of the particular command line which has been associated to the new service by the NT Service Control Manager, as explained above. The process particularly uses the option of the command line defined above, and which contains a reference to the package.ini description file. The opening of the package.ini description file causes the identification of the different files which are to be installed on computer 11, and thus their downloading on a predetermined directory on the hard disk drive of the latter, as illustrated in step 43. As known by the skilled man this can be achieved by means of a path relative to the pushservice.exe path.

When all the installation files have been copied onto the hard disk drive of computer 11, the process executed by pushservice.exe causes the execution of the command which is defined at the last line of the package.ini description file, in step 44, and finally launches the unattended setup procedure of the particular application which is concerned. At the completion of the NT service, the latter uninstalls itself in step 45 and stops in accordance with the normal NT service rules.

Whatever the particular mechanism which is used for deploying the Internet Control Agent within the different devices, it will now be described how the complete control of the Intranet can be achieved by external server 1, even when the Intranet is secured by a firewall mechanism.

Figure 5:
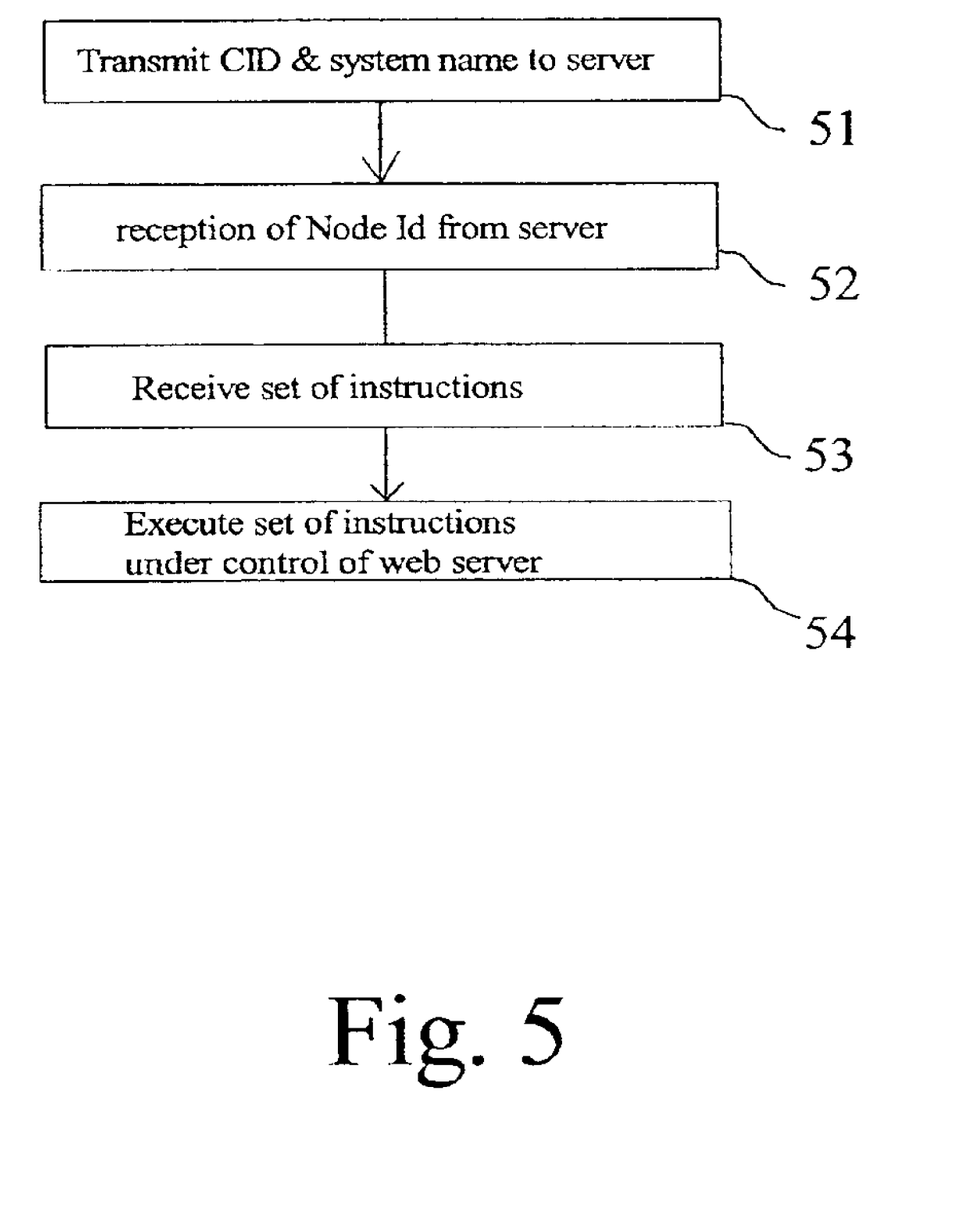
FIG. 5 is a flow chart of the control process executed by the Internet Control Agents.

The control process will be particularly described in reference to FIG. 5.

Once installed, the Agent initiates a connection in step 51 to the Web server via the HTTPS protocol. It issues a POST request, with the Customer Identifier assigned by the Web server 1 during step 31, and the system name.

Then, in step 52, the Agent receives and stores the Node Identifier (NID) which is assigned by Web server 1. The NID is unique and will be used for identifying each device and securing the control process.

Once the NID has been assigned, the agent can then receive a set of specific instructions in step 53 which is decoded and used for controlling the particular management, maintenance and update of the considered network devices. In one embodiment, the set of instructions is embedded within a TEXT file or a XML file, and includes the following commands:

The set of instructions, once received, can be executed in step 54 by the Internet Control Agent for the purpose of a wide variety of different management tasks. Indeed, a specific set of commands has been designed for that control of the network through the external Web server 1. These particularly include the following commands useful for computers and servers.

A DOWNLOAD command is used for controlling Agent in order to download files connected in shared resources on the network.

An EXECUTE command is used for the purpose of executing an NT command line, ie an executable local file or existing in a share resource. Two parameters are associated to that command. A first one corresponds to a maximum time for execution and watchdog mechanism for the purpose of preventing an infinite wait in the case of an error condition occurrence. A second parameter is used for defining the name of a report file which the Agent post back to server 1 via a HTTPS request. In one embodiment, the report file takes the form of a TXT file or a XML file.

A SLEEP command is used for scheduling the next execution of the Internet Control Agent for the purpose of the execution of a new set of commands or instructions.

An AUTO-UPDATE command is used for controlling the update of the kernel of the Internet Control Agent installed within the considered device. For this purpose, a temporary service is being launched in NT type machines, which receives, as an option, the name of the file which is to be installed, the name of the previous which is to be uninstalled, and the name of the process which is to be stopped. Such a result may also been obtained with the use of a Dynamic Link Library (DLL) file in Windows™ 9x machines.

An UNINSTALL command is used for controlling the un installation of the Agent within the considered device.

By using the set of commands described, there is provided an effective way for controlling independently the different devices which are connected to the Intranet network. By taking advantage of the HTTP or HTTPS protocol which is well accepted through the proxy and the firewall mechanisms, there is permitted to take the control of the Intranet network and remotely manages its different devices.

Should the Web service, in accordance with the information loaded within database 2, controls the installation of a specific software package within device 7 for instance, the Web server transmits the following set of commands to that device.

1. download http://portal.hp.com/_user.cab .\_user.cab
2. download http://portal.hp.com/_isdel.exe .\_isdel.exe
3. download http://portal.hp.com/setup.exe .\setup.exe
4. execute .\setup.exe -s It will now be explained how the process can be used in combination with a software executable which is dedicated to the gathering of important technical information about the hardware and the software of a considered machine. To achieve this, Internet Control Agent controls the downloading and the installation of a specific executable file—a so called sysinfo.exe executable file—for the purpose of collecting data representative of the hardware of the device. That particular file, once loaded, accesses the internal technical parameters which are loaded into the BIOS layer. Once installed, the sysinfo.exe executable file extracts system information directly from the SMBIOS tables, or interrogates the Desktop Management Interface (DMI), or Windows Management Interface (WMI) as known from Microsoft. As known by the skilled man, the DMI and WMI interfaces are Application Programming Interfaces (API) that consists of a set of routines that are called for accessing the information relevant to the host machine. Basic information relating to the DMI programming interface can be found at the address www.dmtf.org/.

By using the DMI or WMI interfaces, or by accessing directly the SMBIOS level, the sysinfo.exe executable file accesses the different tables contained in the System Management BIOS (SMBIOS) for the purpose of reporting comprehensive information regarding the user's configuration, and required for completing a request for transaction. Such information includes the system manufacturer, model, version and serial number, the type and speed of processors, the type of chipset, the number, manufacturer and size of hard disk drives, the particular graphic card being used, the memory size and speed, the serial number of the display, the reference of the operating system and so on.

Once the different relevant parameters are gathered from the DMI or WMI interface, the Internet Control Agent compiles the comprehensive information which has been gathered into a report file, which report is transmitted through external server 1 and stored within database 2 for the purpose of enhancing the control over the different devices. In the preferred embodiment, the local agent issues a request for transaction which may be embedded into a HTTP POST request which is recognised at every level, and particularly by every Proxy.

While the auto-discovery mechanism permits the comprehensive description of the Intranet, for the purpose of storing the corresponding information within database 2, the IT administrator still keeps the possibility to manually register computers which are outside the firewall and which can not be normally discovered by the mechanism described above. This is the case of portable computers which may be registered independently. However, it is clear that, once registered, the portable computer may be fitted with the Internet Control Agent which may communicate with server 1 and receives the sets of instructions as for the other devices within the Intranet. The portables computers therefore receive the possibility of an automatic maintenance and update capabilities.

What is claimed is:

1. Process for controlling an Intranet network by means of a Web server, characterized in that it involves the steps of: discovering the devices of an Intranet network, including the different subnets; extracting data representative of those devices for the purpose of compiling a file which is transmitted through a HTTP protocol to said Web server; deploying a set of Internet Control Agents in the devices contained within said Intranet, said agent being controllable by a set of commands which are exchanged by means of the HTTP or HTTPS protocol; thereby allowing the control of the Intranet by the Web server.

2. Process according to claim 1 characterised in that each Internet Control Agent regularly transmits a HTTP or HTTPS request to said server for the purpose of requesting a new set of instructions to be executed.

3. Process according to claim 2 characterised in that said set of instructions is used for controlling a remote installation of the software package within the devices.

4. Process according to claim 3 characterised in that said set of instructions is used for controlling an executable file for extracting technical data stored within the BIOS and the registry of the computers within the Intranet, said technical data being compiled in a text which is transmitted back to said server via a HTTP or HTTPS request.

5. Process according to claim 2 wherein said set of instructions includes an EXECUTE command for the purpose of executing a particular executable file located in a share resources, said EXECUTE command having a first parameter defining the maximum time allowed to the execution and a second parameter defining the file where a report of the execution has to be created.

6. Process according to claim 2 wherein said set of instructions includes a DOWNLOAD command used for controlling said Internet Control Agent to download files connected in shared resources on the network.

7. Process according to claim 2 wherein said set of instructions includes a SLEEP command for scheduling the next execution of the Internet Control Agent for the purpose of the execution of a new set of commands or instructions.

8. Process according to claim 2 wherein said set of instructions includes a AUTO-UPDATE command used for controlling the update of the kernel of said Internet Control Agent installed within the considered device.

9. Process according to claim 1 characterised in that the installation of said Internet Control Agent in said computers operating under NT type environment is carried out by means of a NT service under control of a NT service control manager.

10. Process according to claim 9 wherein the installation successively involves the step of: installing an executable file for controlling a local setup procedure under the control of the NT service control manager (SCM) and in accordance with the description contained within a description file (package.ini) present on a shared resources; said executable file (pushservice.exe) receiving the format of a NT service; starting said executable file so as it becomes available to said computer as a service and permits the launching of a local setup procedure within said computer in accordance with the contents of said description file (package.ini).

11. Process according to claim 1 comprising a discovery mechanism based on the current IP address with a subnet mask being associated to the address of the router of the considered subnet, and using a PING for the purpose of discovering any active node within said subnet.

12. Process according to claim 11 wherein said detection of an active node is completed with a Simple Network Management Protocol (SNMP) for the purpose of determining the type of the device to be reported to said Web server.

* * * * *